US008561084B2

(12) United States Patent
Evans et al.

(10) Patent No.: US 8,561,084 B2
(45) Date of Patent: Oct. 15, 2013

(54) SCOPING AN ALIAS TO A SUBSET OF QUEUE PARTITIONS

(75) Inventors: Tom Evans, Southampton (GB); Graham D. Wallis, West Wellow (GB); David Ware, Redlynch (GB); Christopher Wilkinson, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1171 days.

(21) Appl. No.: 12/199,059

(22) Filed: Aug. 27, 2008

(65) Prior Publication Data
US 2010/0058357 A1 Mar. 4, 2010

(51) Int. Cl.
*G06F 3/00* (2006.01)

(52) U.S. Cl.
USPC ............................................... 719/314

(58) Field of Classification Search
USPC ........................................ 719/310; 707/792
See application file for complete search history.

(56) References Cited

U.S. PATENT DOCUMENTS

| | | | |
|---|---|---|---|
| 6,424,992 B2 | 7/2002 | Devarakonda et al. | |
| 6,789,133 B1 * | 9/2004 | Crandall et al. | 710/5 |
| 7,047,322 B1 * | 5/2006 | Bauman et al. | 710/6 |
| 7,461,238 B2 * | 12/2008 | Luick | 712/216 |
| 7,689,485 B2 * | 3/2010 | Kanekar et al. | 705/35 |
| 7,895,328 B2 * | 2/2011 | Eibach et al. | 709/226 |
| 2003/0088672 A1 | 5/2003 | Togasaki | |
| 2003/0193912 A1 * | 10/2003 | O'Neill | 370/331 |
| 2004/0088702 A1 * | 5/2004 | Garthwaite et al. | 718/100 |
| 2005/0171937 A1 * | 8/2005 | Hughes et al. | 707/3 |
| 2006/0047831 A1 | 3/2006 | Piper | |
| 2006/0233106 A1 | 10/2006 | Achlioptas et al. | |
| 2007/0209039 A1 * | 9/2007 | Kitagawa et al. | 719/314 |
| 2007/0271303 A1 * | 11/2007 | Menendez et al. | 707/200 |
| 2009/0133021 A1 * | 5/2009 | Coulter et al. | 718/102 |

OTHER PUBLICATIONS

Mohammed Hawa, Quality of Service Scheduling in Cable and Broadband Wireless Access systems, 2002.*

* cited by examiner

*Primary Examiner* — Lechi Truong
(74) *Attorney, Agent, or Firm* — Cantor Colburn LLP; Alvin Borromeo

(57) ABSTRACT

A method of performing message operations includes receiving a message operation request identifying a queue, retrieving a list of the subset of partitions associated with the alias received in the request, and selecting at least one of the partitions within the retrieved subset. According to the method, the queue includes a plurality of partitions, the request identifies the queue with an alias, and the alias having a subset of the plurality of partitions associated therewith.

6 Claims, 4 Drawing Sheets

SCOPING AN ALIAS TO A SUBSET OF QUEUE PARTITIONS

BACKGROUND

Embodiments of the present invention are generally directed to asynchronous messaging methods, and more particularly, to a method of scoping an alias to a subset of queue partitions in an asynchronous messaging system.

Generally, an asynchronous messaging system handles messages addressed to a queue that may be hosted by a cluster and may have multiple partitions. A message may be routed to a dynamically chosen partition in order to achieve workload balancing of message traffic across the cluster. Also, the queue name may be qualified with the partition to use, therefore maintaining affinity between the producer of the message and the particular partition to which its messages should be sent (e.g., when producing a sequence of related messages that must be delivered to the same consumer and optionally must be processed in the same order that they were produced).

The qualification of partition by message producer or consumer is useful to support affine routing but it does not take into consideration the current or intended states of the servers that are hosting the partitions of the queue. The producers may be running as remote clients and thus have no visibility of such state. The administrator of the servers hosting the partitions of the queue or the consumers of messages from that queue may wish to take one server offline (e.g., for hardware or software maintenance or upgrade). Alternatively, the administrator may upgrade the version of consuming applications attached to one or more of the partitions of the queue. In either of these scenarios, the administrator may want to exclude some partitions from the set over which a message stream may be workload balanced. The administrator may have other reasons for wanting to route a message stream to a subset of partitions. There is no configuration entity that allows them to do this.

Therefore, example embodiments of the present invention provide scoping an alias to a subset of queue partitions.

BRIEF SUMMARY

An embodiment of the invention includes a method of performing messaging operations. The method includes receiving a message operation request identifying a queue, retrieving a list of the subset of partitions associated with the alias received in the request, and selecting at least one of the partitions within the retrieved subset. According to the method, the queue includes a plurality of partitions, the request identifies the queue with an alias, and the alias having a subset of the plurality of partitions associated therewith.

Another embodiment of the invention includes a computer program product. The computer program product includes a computer program with computer executable instructions that, when executed on a computer apparatus, direct a processor of the computer apparatus to execute the computer executable instructions, the computer executable instructions including a method of queuing a message. The method includes receiving a request to queue the message, retrieving a list of the subset of partitions associated with the alias received in the request, and selecting at least one of the partitions within the retrieved subset. According to the method, the queue includes a plurality of partitions, the request identifies the queue with an alias, and the alias having a subset of the plurality of partitions associated therewith.

Another embodiment of the invention includes a messaging system. The messaging system includes a message server, a queue in operative communication with the message server, and a messaging application in operative communication with the queue. The message server is configured to issue a request to queue messages transmitted there-from, the queue includes a plurality of partitions, the request identifies the queue with an alias, and the alias having a subset of the plurality of partitions associated therewith.

BRIEF DESCRIPTION OF THE SEVERAL VIEWS OF THE DRAWINGS

These and other features, aspects, and advantages of the present invention will become better understood as the following detailed description is read with reference to the accompanying drawings in which like reference numerals represent like elements throughout the drawings, wherein.

DETAILED DESCRIPTION

Figure 1:
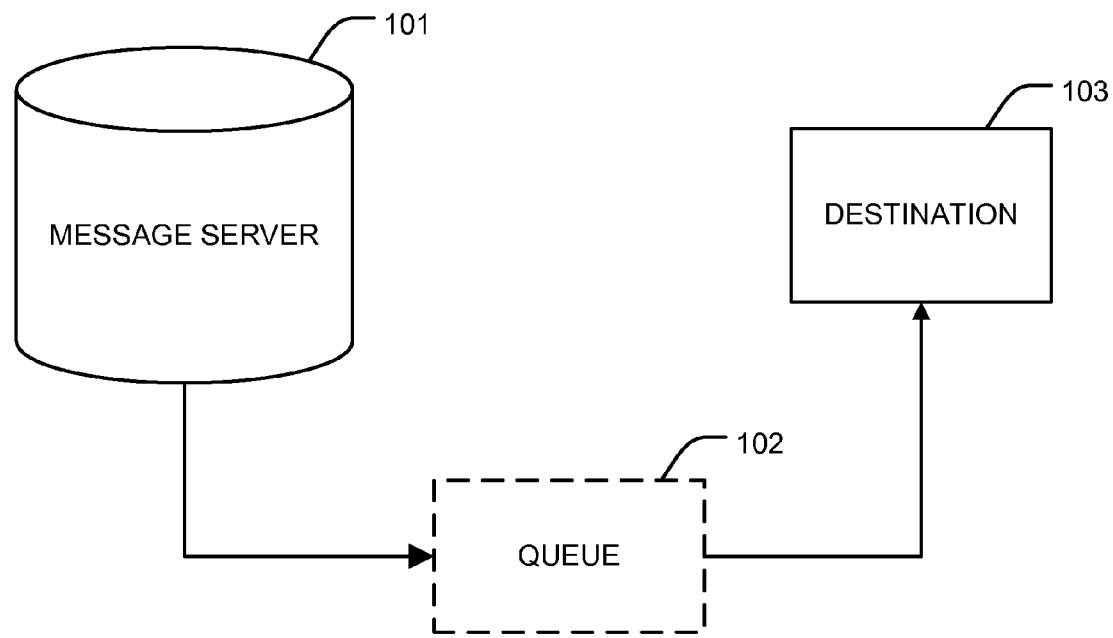
FIG. 1 illustrates an asynchronous messaging system, according to an example embodiment.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail. According to example embodiments, a messaging system for applications may address messages to an alias which provides a synonym (or reference) to the real queue name. Furthermore, the alias may be extended to include specification of a subset of partitions or instances of a clustered queue. Thus, according to example embodiments, it is possible for an administrator to control the set of partitions to which messages can be routed and messaging operations can be performed.

Turning to FIG. 1, an asynchronous messaging system 100 is illustrated, according to an example embodiment. The system 100 includes a message server 101. For example, the message server 101 may be a publish/subscribe message server, an application transmitting a message, or any suitable server providing messages to another location.

The system 100 further includes a queue 102. For example, the queue 102 may conceptually hold messages being transmitted through the system 100. Message servers may post messages to and retrieve messages from queues through programming/communication interfaces and messaging operations. As used herein, a messaging operation may include transmitting a message to a queue, retrieving a message from a queue, and/or viewing a message on a queue. The use of the queuing paradigm allows the sender and the receiver of a message to operate asynchronously. For example, a queue acts as a mailbox that is managed by a computer server. A queue is configured to store messages until the messages are received by the application that draws the messages from the queue.

An extension of the queue concept is a clustered queue. A clustered queue is a queue that is managed by a number of servers, to provide additional scalability or bandwidth, to facilitate more messages to be processed and stored. A clustered queue is logically just a single queue, except that where a queue may be thought of as a mailbox, a clustered queue would have an array of mailboxes that are referred to as "partitions" of the queue. Each message addressed to the clustered queue is routed to one of the partitions. A partition is chosen dynamically by the messaging system so that the programming model experienced by an application is as simple as possible, by making the queue appear as one addressable entity, and having the messaging system make the workload balancing and routing decisions automatically. A typical use for a clustered queue is to support multiple parallel responders, each of which serves one partition of the request queue. The parallelism, of the responders, allows multiple requests to be handled simultaneously.

As the sender and receiver work asynchronously the number of senders and receivers does not need to match. There may be many senders posting messages occasionally but only a few receivers continuously picking up new messages and acting on them.

Turning back to FIG. 1, the system 100 may further include a messaging application 103. For example, as described above, the messaging application (e.g., receiver) may retrieve messages from the queue 102. Hereinafter, a more detailed example of a queue is described with reference to FIG. 2.

Figure 2:
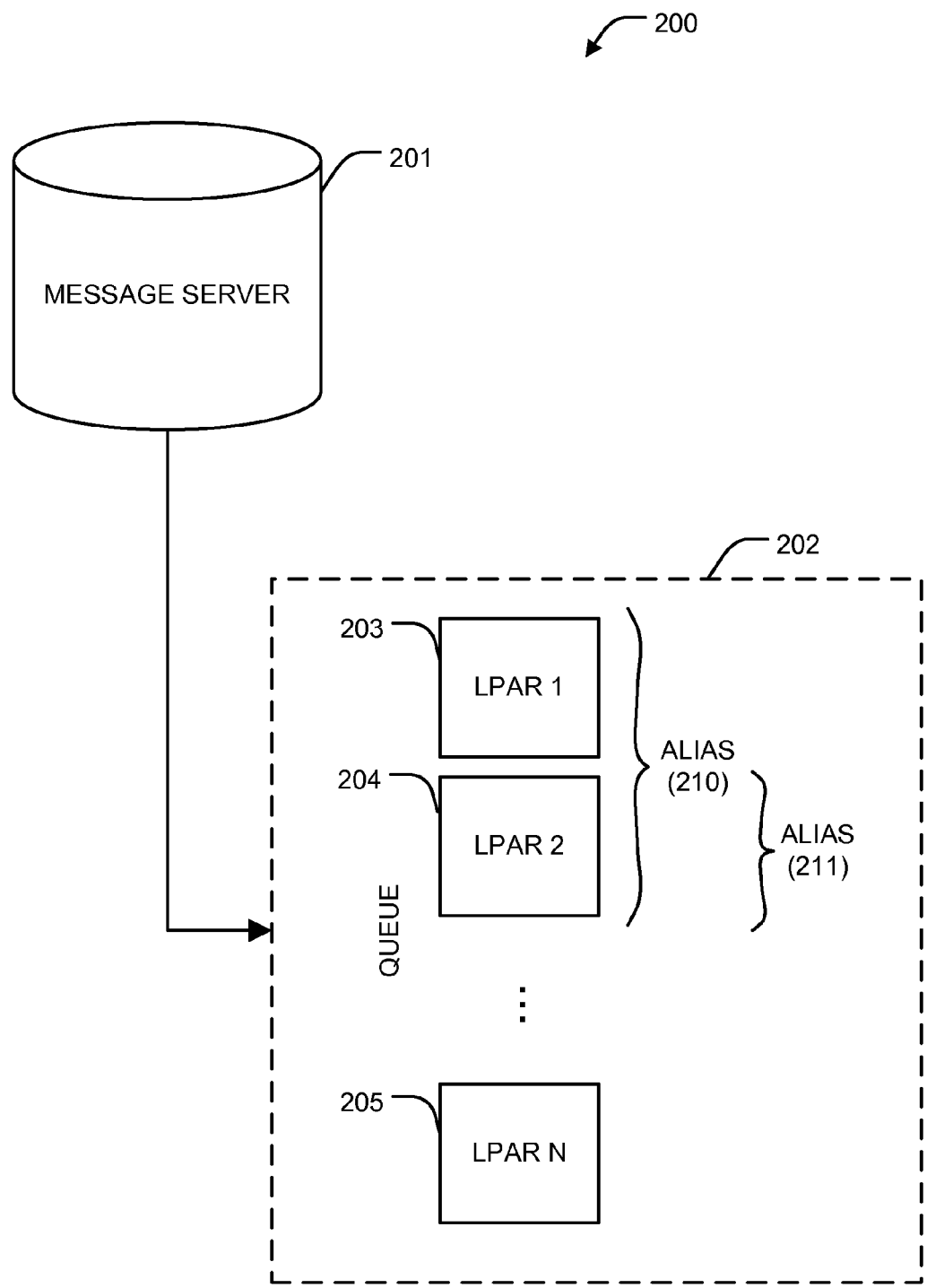
FIG. 2 illustrates an asynchronous messaging system, according to an example embodiment.

FIG. 2 illustrates an asynchronous messaging system 200, according to an example embodiment. The system 200 may include a message server 201. For example, the message server 201 may be substantially similar to the message server 101 of FIG. 1. The system 200 further includes queue 202.

The queue 202 may be a queue configured to receive and hold/transmit messages in the asynchronous messaging system 200. For example, the queue 202 may receive messages from the message server 201, and may hold them until an appropriate application retrieves the message.

The queue 202 may include plurality of logical partitions (LPAR) 203-205. The logical partitions may be partitions of a server or any other suitable partition. For example, each partition of the logical partitions 203-205 may be in an active or non-active state. Furthermore, according to example embodiments, each partition of the logical partitions 203-205 may be associated with an alias (e.g., Alias 210). Therefore, messages transmitted to the queue 202 from the message server 201 may be queued in a logical partition based on an associated alias. More clearly, messaging operations may be performed on a subset of the partitions of the queue 202 based on the associated alias.

For example, the message server 201 may receive requests to perform messaging operations on a particular address. The address may identify a queue and/or alias. Thus, messaging operations may be based on the address associated with the alias. An alias can be used to map multiple addresses down to a single underlying queue. Typically an alias can be used to override the basic behavior of the messaging operation on the underlying queue. So different aliases are used by different messaging applications to interact with a common queue in different ways.

For example, an administrator may selectively divert traffic away from a subset of logical partitions through manipulation of the logical partitions associated with an alias (e.g., to prepare for taking that subset offline), or can expose a choice of aliases that each route to a different subset. A use of the latter example is when messages of different (incompatible) application version formats must be routed to consumers whose versions match those of the messages. For example, a version V producer may produce messages that can be received and processed by consumers of versions V and V'. However a version V' producer may produce messages that can only be received and processed by a version V' consumer. The administrator can therefore expose two aliases (e.g. "aliasV" and "aliasV'") each of which routes messages to a single queue, but with different sets of partitions matching the sets of consumers able to process messages of version V and V' respectively depending upon the alias used in message transmission.

Therefore, the selective routing based on the alias is transparent to the applications and is under the control of the messaging administrator, who has complete flexibility to upgrade or downgrade servers or applications and take them offline when necessary without disruption of the messaging system. It is noted that aliases are applicable to messaging operations in general, and thus should not be limited to this specific example of message transmission. For example, aliases may similarly be applied to message retrieval and message viewing as well. Hereinafter, a more detailed discussion of messaging operations using an asynchronous messaging system is described according to an example embodiment.

Figure 3:
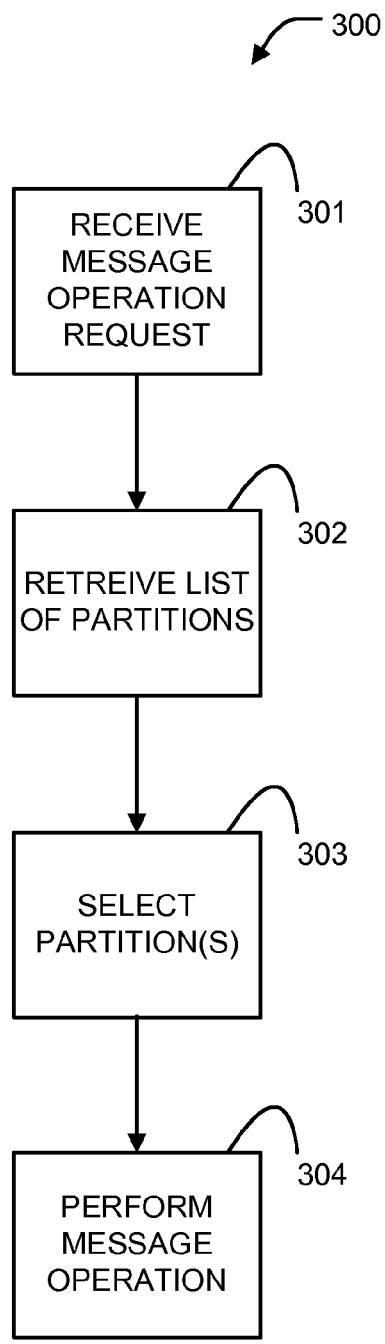
FIG. 3 illustrates a method of performing message operations, according to an example embodiment.

FIG. 3 illustrates a method 300 of performing message operations, according to an example embodiment. The method includes receiving a message operation request at block 301. The message operation identifies a queue for the message operation to be performed on. For example, the queue includes a plurality of partitions, as described above with reference to FIG. 2. It follows that the request identifies an alias to the queue, for performing the message operation. The alias has a subset of the plurality of partitions associated therewith, the subset being logical partitions to which message operation should be performed upon.

The method 300 further includes retrieving a list of the subset of partitions at block 302. For example the list includes the subset of partitions associated with the alias received in the request (e.g., at block 301).

The method 300 further includes selecting at least one of the partitions at block 303. For example, the at least one partitions is within the retrieved subset (e.g., the list includes the subset).

The method 300 further includes performing the message operation at block 304.

Therefore, as described above, example embodiments provide systems and methods for scoping an alias in asynchronous messaging systems. The systems may include queues with a plurality of partitions, with a subset of those partitions being associated with an alias. The alias may be managed by an administrator such that a transparent queuing of messages may occur, even when upgrading or deactivating partitions or system resources. The methods may include retrieving the subsets of partitions associated with aliases such that message operations are performed on the appropriate subset of a queue's partitions.

Figure 4:
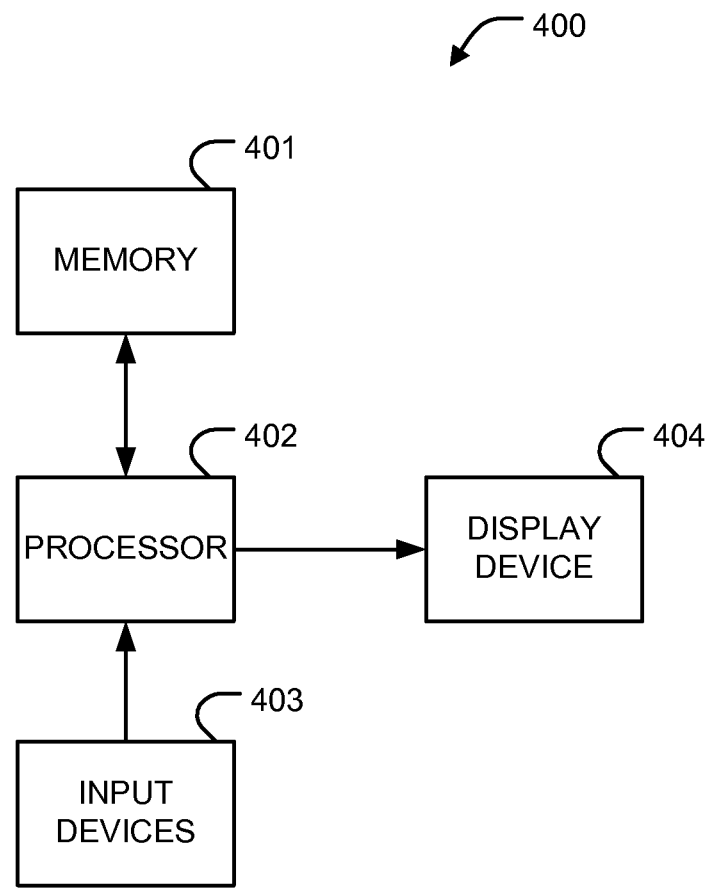
FIG. 4 illustrates a computer apparatus, according to an example embodiment.

Furthermore, according to an exemplary embodiment, the methodologies described hereinbefore may be implemented by a computer system or apparatus. For example, FIG. 4 illustrates a computer apparatus, according to an exemplary embodiment. Therefore, portions or the entirety of the methodologies described herein may be executed as instructions in a processor 402 of the computer system 400. The computer system 400 includes memory 401 for storage of instructions and information, input device(s) 403 for computer communication, and display device 404. Thus, the present invention may be implemented, in software, for example, as any suitable computer program on a computer system somewhat similar to computer system 400. For example, a program in accordance with the present invention may be a computer program product causing a computer to execute the example methods described herein.

The computer program product may include a computer-readable medium having computer program logic or code portions embodied thereon for enabling a processor (e.g., 402) of a computer apparatus (e.g., 400) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

With only some example embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

The invention claimed is:

1. A method of performing message operations, comprising:

receiving a message operation request identifying a queue, wherein, the queue includes a plurality of partitions, the request identifies the queue with an alias, and the alias having a subset of the plurality of partitions associated therewith, the plurality of partitions part of a client/server-based messaging system;

retrieving a list of the subset of partitions associated with the alias received in the request;

selecting at least one of the partitions within the retrieved subset;

performing the message operation responsive to the selected at least one partition based on the alias associated therewith;

deactivating at least one partition of the subset of partitions associated with the alias:

diverting traffic from the at least one deactivated partition: and managing the alias associated with the at least one deactivated partition such that the alias no longer is associated with the at least one deactivated partition.

2. The method of claim 1 , wherein:

the list of the subset of partitions excludes logical partitions of the plurality of logical partitions that are not active.

3. The method of claim 1, wherein the queue is a queue of an asynchronous messaging system.

4. A computer program product including a computer program with computer executable instructions that, when executed on a computer apparatus, direct a processor of the computer apparatus to execute the computer executable instructions, the computer comprising:

a computer readable storage medium having computer program logic, the computer program logic comprising:

a program logic for receiving a message operation request identifying a queue, wherein, the queue includes a plurality of partitions, the request identifies the queue with an alias, and the alias having a subset of the plurality of partitions associated therewith, the plurality of partitions part of a client/server-based messaging system;

a program logic for retrieving a list of the subset of partitions associated with the alias received in the request;

a program logic for selecting at least one of the partitions within the retrieved subset;

a program logic for performing the message operation responsive to the selected at least one partition based on the alias associated therewith;

deactivating at least one partition of the subset of partitions associated with the alias;

diverting traffic from the at least one deactivated partition; and managing the alias associated with the at least one deactivated partition such that the alias no longer is associated with the at least one deactivated partition.

5. The computer program product of claim 4, wherein:
the list of the subset of partitions excludes logical partitions of the plurality of logical partitions that are not active.

6. The computer program product of claim 4, wherein the queue is a queue of an asynchronous messaging system.

* * * * *